US011729160B2

(12) United States Patent
Agrawal

(10) Patent No.: US 11,729,160 B2
(45) Date of Patent: Aug. 15, 2023

(54) SYSTEM AND METHOD FOR SELECTING AUTHENTICATION METHODS FOR SECURE TRANSPORT LAYER COMMUNICATION

(71) Applicant: Nutanix, Inc., San Jose, CA (US)

(72) Inventor: Sunil Agrawal, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 62 days.

(21) Appl. No.: 16/998,852

(22) Filed: Aug. 20, 2020

(65) Prior Publication Data

US 2021/0119991 A1    Apr. 22, 2021

Related U.S. Application Data

(60) Provisional application No. 62/916,075, filed on Oct. 16, 2019.

(51) Int. Cl.
*H04L 29/06* (2006.01)
*H04L 9/40* (2022.01)
(Continued)

(52) U.S. Cl.
CPC .......... *H04L 63/0823* (2013.01); *H04L 41/22* (2013.01); *H04L 63/0853* (2013.01);
(Continued)

(58) Field of Classification Search
CPC . H04L 41/22; H04L 63/0823; H04L 63/0853; H04L 63/166; H04L 63/168; H04L 67/02
See application file for complete search history.

(56) References Cited

U.S. PATENT DOCUMENTS 8,185,945 B1 *  5/2012 Eatough .............. H04L 63/0823
                                                        713/168
8,549,518 B1    10/2013 Aron et al.
(Continued)

OTHER PUBLICATIONS

Duy An Ha et al., Efficient Authentication of Resource-Constrained IoT Devices based on ECQV Implicit Certificates and Datagram Transport Layer Security Protocol, Dec. 8, 2016, ACM, pp. 173-179. (Year: 2016).*

(Continued)

*Primary Examiner* — Luu T Pham
*Assistant Examiner* — Fahimeh Mohammadi
(74) *Attorney, Agent, or Firm* — Shun Yao; Yao Legal Services, Inc.

(57) ABSTRACT

One embodiment of the present invention provides an enhanced authentication system. During operation, the system can obtain, from a remote device of a client, an authentication request prior to the exchange of application layer web traffic associated with a piece of resource protected by the system. The system can then determine, in the authentication request, an indicator indicating whether certificate-based authentication is enforced for the client. If certificate-based authentication is enforced for the client, the system can initiate certificate-based authentication for the client. On the other hand, if certificate-based authentication is not enforced for the client, the system can send information associated with a user interface to the client. The user interface can allow the client to select an authentication method from a set of authentication methods supported by the system.

20 Claims, 9 Drawing Sheets

(51) Int. Cl.
*H04L 41/22* (2022.01)
*H04L 67/02* (2022.01)

(52) U.S. Cl.
CPC .......... *H04L 63/166* (2013.01); *H04L 63/168* (2013.01); *H04L 67/02* (2013.01)

(56) References Cited

U.S. PATENT DOCUMENTS

| | | | |
|---|---|---|---|
| 8,601,473 | B1 | 12/2013 | Aron et al. |
| 8,850,130 | B1 | 9/2014 | Aron et al. |
| 9,772,866 | B1 | 9/2017 | Aron et al. |
| 10,122,577 | B1* | 11/2018 | Rykowski ............. H04L 63/166 |
| 11,140,157 | B1* | 10/2021 | Xia ...................... H04L 63/0853 |
| 2002/0087894 | A1* | 7/2002 | Foley .................. H04L 63/0853 726/4 |
| 2012/0072979 | A1* | 3/2012 | Cha ...................... H04W 12/069 726/8 |
| 2013/0173914 | A1* | 7/2013 | Falk ...................... H04L 9/3268 713/156 |
| 2013/0198822 | A1* | 8/2013 | Hitchcock ............. G06F 21/335 726/5 |
| 2014/0189808 | A1* | 7/2014 | Mahaffey ................ G06F 21/31 726/4 |
| 2015/0365412 | A1* | 12/2015 | Innes ...................... H04L 63/08 726/7 |
| 2016/0094543 | A1* | 3/2016 | Innes .................... H04L 63/061 726/6 |
| 2017/0134444 | A1* | 5/2017 | Buckley .............. H04L 65/1016 |
| 2017/0346853 | A1* | 11/2017 | Wyatt ................. H04L 63/1425 |
| 2018/0026968 | A1* | 1/2018 | Canavor ............. H04L 63/0823 726/6 |
| 2019/0297071 | A1* | 9/2019 | Canavor ................. G06F 21/31 |
| 2021/0056193 | A1* | 2/2021 | Xia .................... G06Q 20/3821 |
| 2021/0112065 | A1* | 4/2021 | Yang ....................... H04L 63/18 |
| 2021/0211279 | A1* | 7/2021 | Nix ....................... H04W 12/06 |

OTHER PUBLICATIONS

Chang Pei Shan et al., Automated Login Method Selection in a Multimodal Authentication System, Jun. 24, 2019, IEEE, pp. 120-124. (Year: 2019).*

Bruce Beckles et al., Audited Credential Delegation: a Sensible Approach to Grid Authentication, Feb. 8, 2010, IEEE, pp. 19-30. (Year: 2010).*

Khidir M. Ali et al., A Comparative Study of Authentication Methods for Wi-Fi Networks, Aug. 29, 2011, IEEE, pp. 190-194. (Year: 2011).*

1 Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Poitras, Steven. "The Nutanix Bible" (Jul. 25, 2019), from https://nutanixbible.com/ pp. all.

Poitras, Steven. "The Nutanix Bible" (Sep. 17, 2019), from https://nutanixbible.com/ pp. all.

Cano, Ignacio et al. "Curator: Self-Managing Storage for Enterprise Clusters"; University of Washington; published Mar. 2017; pp. all.

Poitras, Steven. "The Nutanix Bible" (Jan. 21, 2020), from https://nutanixbible.com/ pp. all.

Poitras, Steven. "The Nutanix Bible" (Sep. 14, 2020), from https://nutanixbible.com/ pp. all.

* cited by examiner

SYSTEM AND METHOD FOR SELECTING AUTHENTICATION METHODS FOR SECURE TRANSPORT LAYER COMMUNICATION

RELATED APPLICATIONS

This application claims the benefit of U.S. Provisional Application No. 62/916,075, titled "Authentication Method Selection for Secured Communication in Transport Layer," by inventor Sunil Agrawal, filed 16 Oct. 2019, the disclosure of which is incorporated by reference herein.

BACKGROUND

Field

The present disclosure relates to user authentication in a distributed environment. More specifically, the present disclosure relates to a method and a system that facilitates the efficient selection of authentication methods for secure transport layer communication.

Related Art

As Internet traffic is becoming more diverse, remote access is becoming progressively more important as a value proposition for distributed systems. In addition, the evolution of virtual private network (VPN) has made remote access feasible and, consequently, placed additional requirements on the authentication systems. For example, a large number of users may remotely access the resources of an enterprise. It is often desirable that the authentication infrastructure can support a large number of users and ensure secure access to each of them.

As a result, system vendors race to build authentication systems with versatile capabilities, such as smart-card-based authentication as well as legacy authentication mechanisms, to accommodate diverse user requirements efficiently. However, authentication systems with diverse capabilities are usually more complex. More importantly, because a diverse authentication system often requires more opening in the firewall of an enterprise network, simply increasing the versatility of an authentication system may become infeasible. To facilitate a diverse selection of authentication methods in a secure way, an authentication system needs to deploy the authentication methods without requiring changes in the firewall.

While authentication systems bring many desirable features to remote access, some issues remain unsolved in efficiently selecting an authentication mechanism in transport layer communication.

SUMMARY

One embodiment of the present invention provides an enhanced authentication system. During operation, the system can obtain, from a remote device of a client, an authentication request prior to the exchange of application layer web traffic associated with a piece of resource protected by the system. The system can then determine, in the authentication request, an indicator indicating whether certificate-based authentication is enforced for the client. If certificate-based authentication is enforced for the client, the system can initiate certificate-based authentication for the client. On the other hand, if certificate-based authentication is not enforced for the client, the system can send information associated with a user interface to the client. The user interface can allow the client to select an authentication method from a set of authentication methods supported by the system.

In a variation on this embodiment, the authentication request can be based on a Transport Layer Security (TLS) protocol. The indicator can then comprise a domain name and may be included in the server name indication (SNI) extension of the TLS protocol.

In a further variation, the domain name can be one of: a first domain name associated with the certificate-based authentication and a second domain name associated with generic authentication indicated in the user interface.

In a further variation, the first and second domain names correspond to a same point of access indicated by one or more of: an Internet Protocol (IP) address and a port identifier. The first and second domain names can then be accessible via a same pinhole of a firewall of the system.

In a variation on this embodiment, the application layer web traffic is based on Hypertext Transfer Protocol (HTTP) or a variation thereof.

In a variation on this embodiment, the system can determine that the client has selected certificate-based authentication in the user interface. The system can then redirect the request to the indicator indicating that certificate-based authentication is enforced for the client.

In a variation on this embodiment, the system can determine an authentication method selected at the user interface. The system can then send, to the remote device, a request for authentication information that authenticates the client using the selected authentication method.

In a variation on this embodiment, the system can initiate the certificate-based authentication for the client by obtaining a certificate configured in a smart card of the client and validating the certificate and an identity of the client.

In a further variation, the smart card can be a common access card (CAC). The certificate-based authentication can then include CAC-based authentication.

BRIEF DESCRIPTION OF THE FIGURES

In the figures, like reference numerals refer to the same figure elements.

DETAILED DESCRIPTION

Figure 1A:
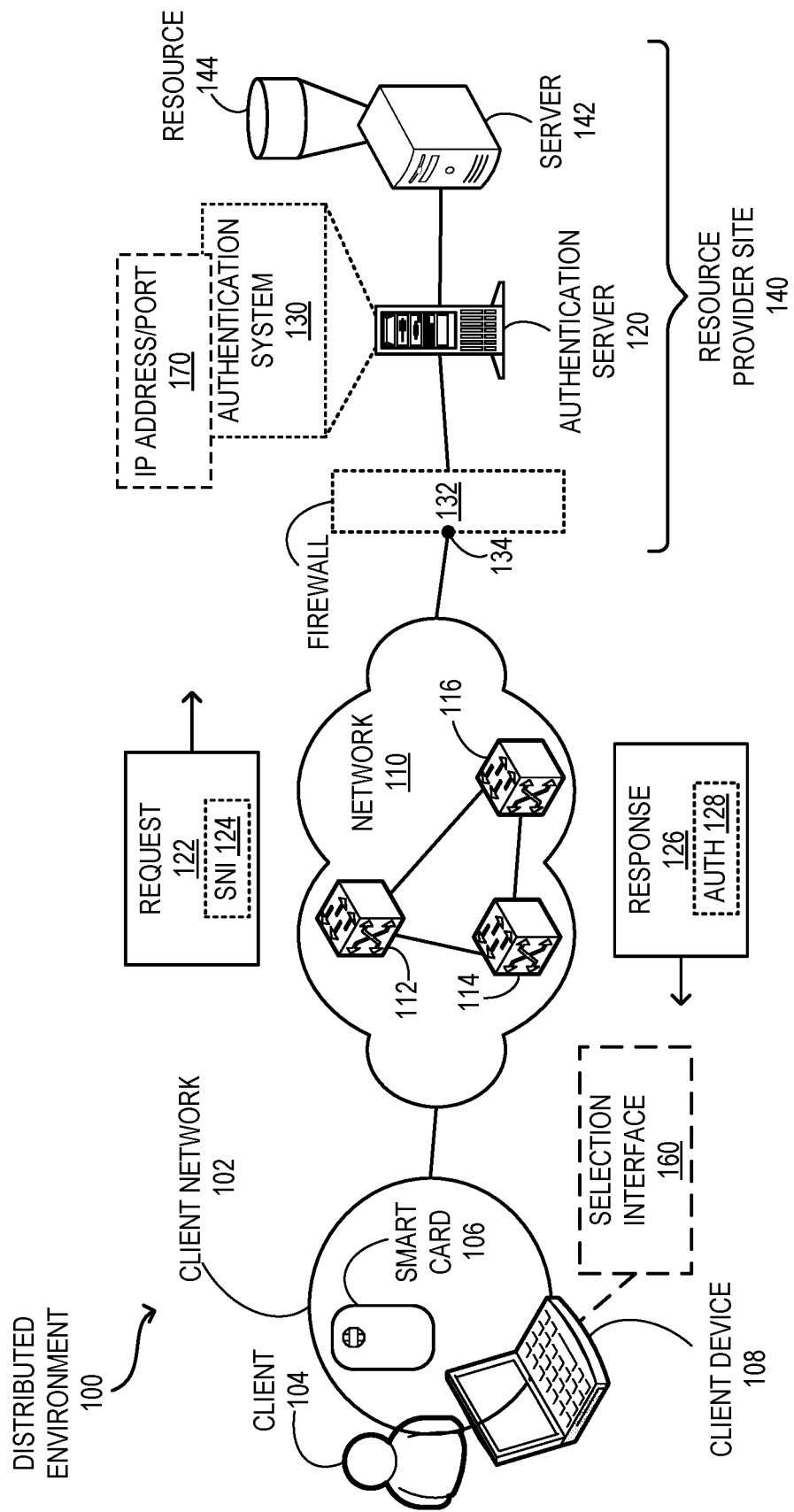
FIG. 1A illustrates an exemplary distributed environment that supports an efficient selection of authentication methods for secure transport layer communication, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments described herein solve the problem of facilitating a plurality of authentication methods that include certificate-based authentication by (i) maintaining different domain names that represent different authentication methods and correspond to the same point of authentication (e.g., associated with the same Internet Protocol (IP) address), and (ii) allowing a client device to indicate whether an authentication method is enforced in a domain name. In this way, an authentication system can provide different authentication techniques to different clients from the same point of authentication.

In a protected distributed environment, a client wishing to remotely access a piece of resource may require authentication. Typically, different clients may support different authentication methods, such as username and password, Security Assertion Markup Language (SAML) authorization, and Remote Authentication Dial-In User Service (RADIUS) authentication. Consequently, an authentication system can initiate a web communication (e.g., using a Hypertext Transfer Protocol (HTTP) connection) and provide a user interface to the client to select an authentication method that is allowed by the authentication system. Examples of a user interface can include, but are not limited to, a graphical user interface (GUI), a text-based interface, a sensor, and a gesture-based interface. The client can then select an authentication method supported by the client from the user interface. Subsequently, the authentication system can authenticate the client based on the selected authentication method.

However, to facilitate secure communication using Transport Layer Security (TLS), the authentication method can be selected prior to the initialization of the web communication because TLS communication is initiated before any HTTP traffic is exchanged. For example, if a certificate-based authentication technique, such as smart-card-based (e.g., common access card (CAC)-based) authentication, is configured for a client (i.e., authN, which indicates "authentication," is mandatory for the client), the certificate-based authentication can be pre-selected during the TLS handshake. Hence, the certificate-based authentication technique may become pre-selected prior to the authentication system presenting the user interface. As a result, the authentication system may only support certificate-based authentication since the user interface may not be used for selecting an authentication method. Consequently, the authentication system would not be able to provide a fallback choice if certificate-based authentication is unavailable at the client device.

Alternatively, the authentication system may offer two distinct points of authentication (e.g., using two Internet Protocol (IP) addresses) for certificate-based and generic authentications, respectively. In this disclosure, the generic authentication can indicate any authentication method that can be selected from a user interface. However, offering multiple points of authentication may require multiple firewall pinholes (e.g., pass-through holes), which may expose the protected distributed environment to potential malicious activities. As a result, the deployment of certificate-based authentication using TLS may reduce the options for authentication and introduce vulnerability to the authentication system.

To solve this problem, the authentication system can allow a client to specify whether the client intends to use certificate-based authentication during the TLS handshake process. The system can recognize an indicator in the request that can indicate whether the client intends to use certificate-based or generic authentication. In some embodiments, the indicator can be a domain name. The system can then recognize two domain names corresponding to certificate-based and generic authentications, respectively. Both domain names can be associated with the same point of authentication (e.g., the same IP address/port number or identifier). The client can specify one of the domain names in the TLS request. In some embodiments, the client can include the domain name in the server name indication (SNI) extension of TLS. By obtaining an indication about whether to provide the certificate-based authentication, the system can provide both certificate-based and non-certificate-based authentication methods to the client without requiring multiple pinholes in the firewall of the protected distributed environment.

If the piece of resource is accessible via a domain name, the client can prepend the authentication choice to the domain name (e.g., to generate a sub-domain). For example, if the domain name is xyz.com, the authentication choice can be choice.xyz.com. If the choices are cert and nonCert, the corresponding domain names can then be cert.xyz.com and nonCert.xyz.com, respectively. If the client includes nonCert.xyz.com in the SNI extension of a TLS request, the system can determine that authN does not need to be enforced at the TLS level. Accordingly, the system can present the user interface (e.g., using an HTTP connection) to the client and allow the client to select an authentication method. Upon determining the client's choice, the system can authenticate the client based on the selected authentication method.

On the other hand, if the client includes cert.xyz.com in the SNI extension, the system can determine that authN is mandatory at the TLS level. Accordingly, the system can initiate a certificate-based authentication. On the other hand, if the client selects certificate-based authentication from the user interface, the system can redirect the authentication request to cert.xyz.com. Since cert.xyz.com and non-Cert.xyz.com can point to the same IP address/port number or identifier, no additional firewall pinhole is needed. To initiate the certificate-based authentication, the system can request the client's authentication certificate. In some embodiments, the certificate-based authentication can be based on a CAC-based authentication. The CAC of the client can embed the authentication certificate (e.g., an X509 certificate) needed for the authentication. When the client presents the CAC to the authentication server, the system can request a personal identification number (PIN) and/or a password. In this way, the system can provide flexibility in authentication methods without deploying multiple pinholes in the firewall.

In this disclosure, the term "message" refers to a group of bits that can be transported together across a network. "Message" should not be interpreted as limiting embodiments of the present invention to any networking layer. "Message" can be replaced by other terminologies referring to a group of bits, such as "packet," "frame," "cell," or "datagram."

The term "authentication" is used in a generic sense and can refer to any operation(s) that can establish the identity of a client and indicate a level of authorization (or "authZ") of the client on a piece of resource.

The term "switch" is used in a generic sense, and it can refer to any standalone or fabric switch operating in any network layer. "Switch" should not be interpreted as limiting embodiments of the present invention to layer-2 networks. Any physical or virtual device (e.g., a virtual machine, which can be a virtual switch, operating on a computing device) that can forward traffic to an end device can be referred to as a "switch." Examples of such a device include, but not limited to, a layer-2 switch, a layer-3 router, or a routing bridge.

Network Architecture

FIG. 1A illustrates an exemplary distributed environment that supports an efficient selection of authentication methods for secure transport layer communication, in accordance with an embodiment of the present application. As illustrated in FIG. 1A, a distributed environment 100, a resource provider site 140 can facilitate resources, such as processing, storage, and distributed applications (e.g., deployment and management of databases, applications, and virtualized devices) for a client 104. Examples of site 140 can include, but are not limited to, a datacenter, an enterprise office, a database service, and a cloud-based computing platform (e.g., Amazon Web Services, Microsoft Azure, and Nutanix Hyperconverged Infrastructure). Client 104 can access site 140 from client device 108 via a client network 102. Client network 102 can be any edge network that can include one or more of: a local area network (LAN), a virtual LAN (VLAN), an Internet Protocol (IP) sub-network (subnet).

Client network 102 can be coupled to site 140 via a network 110. Network 110 can include a number of switches 112, 114, and 116. Network 110 can be an Ethernet and/or IP network, and a respective switch of network 100, such as switch 112, can be an Ethernet switch and/or IP router. Hence, the communication among the switches in network 110 can be based on Ethernet and/or IP. Network 110 may also be a wide area network (WAN), such as the Internet. Client network 102 can then communicate with site 140 via the cloud. To ensure protected access to the resources, site 140 may deploy an authentication system 130 and a firewall 132. Authentication system 130 may operate on an authentication server 120. Firewall 132 can be an appliance (e.g., a hardware-based firewall device) or a firewall application running on a firewall server, which may or may not be co-located with authentication system 130.

During operation, client 104 may send an authentication request 122 for accessing a piece of resource 144 from a server 142 in site 140. Here, resource 144 and server 142 can be protected by authentication system 130. Authentication system 130 can then authenticate client 104 to ensure that client 104 has privilege to access resource 144. Typically, different clients may support different authentication methods, such as username and password, SAML authorization, and RADIUS authentication. Consequently, authentication system 130 can initiate a web communication (e.g., using an HTTP connection) with device 108 and provide a user selection interface 160 to device 108. Interface 160 can present a set of authentication methods supported by authentication system 130. Interface 160 can be a GUI, a text-based interface, a sensor, or a gesture-based interface. Client 104 can then select an authentication method from interface 160. Subsequently, authentication system 130 can authenticate client 104 based on the selected authentication method.

However, if request 122 is based on TLS, which can ensure enhanced security, presenting interface 160 can be challenging. In particular, client 104 may need to pre-specify the authentication method in request 122 because TLS communication is initiated before any HTTP traffic is exchanged. For example, if a certificate-based authentication technique, such as smart-card-based (e.g., CAC-based) authentication, is configured for client 104 (i.e., authN is mandatory for client 104), the certificate-based authentication can be pre-selected during the TLS handshake. As a result, system 130 may only support certificate-based authentication since interface 130 may not be inter-operable with TLS. Consequently, client 104 may need to use smart card 106, which can be a CAC allocated for client 104, for authentication. However, if smart card 106 is unavailable to client 104, system 130 would not be able to provide a fallback choice to client 104.

Alternatively, authentication system 130 may offer two distinct points of authentication (e.g., using two IP addresses) for certificate-based authentication and generic authentication, respectively. The generic authentication can be any authentication method that can be selected from interface 160. However, offering multiple points of authentication may require multiple pinholes (e.g., pass-through holes) in firewall 132, which may expose site 140 to potential malicious activities. As a result, the deployment of certificate-based authentication using TLS can may reduce the options for authentication system 130 and introduce vulnerability to site 140.

To solve this problem, authentication system 130 can be an enhanced authentication system that can allow client 104 to specify whether client 104 intends to use certificate-based authentication in request 122 during the TLS handshake process. System 130 can recognize an indicator in request 122 that can indicate whether client 104 intends to use certificate-based or generic authentication. The indicator can be any value or bit-pattern in the header (e.g., in a header field) or payload (e.g., based on type-length-value (TLV) encoding) of request 122. In some embodiments, the indicator can be a domain name. System 130 can then recognize two domain names corresponding to certificate-based and generic authentications, respectively.

Both domain names can be associated with the same point of authentication, which can be the same IP address/port number or identifier 170. Client 104 can specify one of the domain names in request 122. In some embodiments, client 104 can include the domain name in the SNI extension 124 of TLS. By obtaining an indication about whether to provide the certificate-based authentication, system 130 can provide both certificate-based and non-certificate-based authentication methods to client 104 using a single pinhole 134 in firewall 132, thereby refraining from introducing additional vulnerability to site 140.

Based on the selected authentication method, system 130 may send a response 126 to client 104. Response 126 can include information 128 associated with the selected authentication method. For example, if client 104 selects certificate-based authentication, information 128 can include a request for client 104's authentication certificate. Smart card 106 of client 104 can embed the authentication certificate (e.g., an X509 certificate) needed for the authentication. When client 104 presents smart card 106 (e.g., based on the certificate) to system 130, system 130 can further request a PIN and/or a password. On the other hand, if client 104 selects generic authentication, system 130 can provide interface 160 to client 104. If client 104 selects SAML authorization, information 128 can include a request for client 104's SAML assertion information (e.g., credentials for Kerberos or multi-factor authentication).

In this way, system 130 can provide flexibility in authentication methods without deploying multiple pinholes in firewall 132. Here, system 130 can facilitate a plurality of authentication methods that include certificate-based authentication by maintaining different domain names that represent different authentication methods and correspond to the same point of authentication (e.g., associated with IP address/port 170. System 130 can then allow client 104, using client device 108, to indicate whether an authentication method is enforced in a domain name. In this way, system 130 can provide different authentication techniques to different clients from the same IP address/port 170.

Figure 1B:
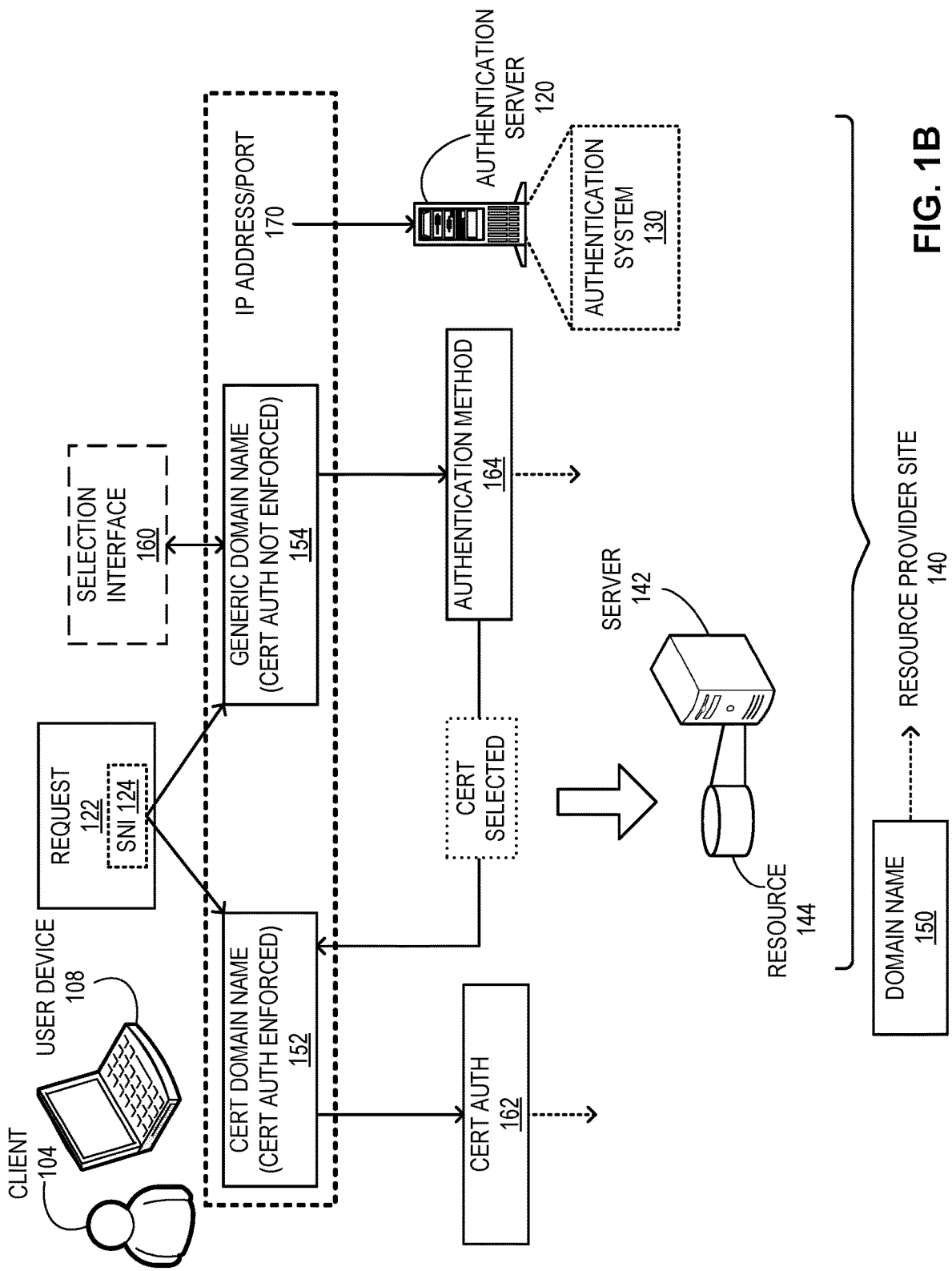
FIG. 1B illustrates an exemplary domain name-based redirection for facilitating selection of authentication methods for secure transport layer communication, in accordance with an embodiment of the present application.

FIG. 1B illustrates an exemplary domain name-based redirection for facilitating selection of authentication methods for secure transport layer communication, in accordance with an embodiment of the present application. If site 140 is accessible via a domain name 150, client 104 can prepend the authentication choice to domain name 150 (e.g., to generate a subdomain) or use separate subdirectories indicating the choice. The choice can be represented in a certificate domain name 152 and a generic domain name 154. If authN is mandatory for client 104, client 104 can use certificate domain name 152. On the other hand, if authN in be enforced for client 104, client 104 can use generic domain name 154.

For example, if domain name 150 is xyz.com, the authentication choice can be choice.xyz.com or xyz.com/choice. If the choices are cert and nonCert, respectively, certificate domain name 152 can be cert.xyz.com, and domain name 154 can be nonCert.xyz.com. If client 104 includes domain name 154 in SNI extension 124 of request 122, system 130 can determine that authN may not be enforced at the TLS level for client 104. Accordingly, system 130 can present interface 160 using an HTTP connection to device 108 and allow client 104 to select an authentication method from interface 160. Upon determining client 104's authentication choice provided in interface 160, system 130 can authenticate client 104 based on selected authentication method 164.

On the other hand, if the client includes domain name 152 in the SNI extension 124, system 130 can determine that authN is mandatory at the TLS level for client 104. Accordingly, system 130 can initiate a certificate-based authentication 162 for client 104. If client 104 selects certificate-based authentication from interface 160, system 130 can redirect request 122 to domain name 152. Since domain names 152 and 154 can point to the same IP address/port 170, when request 122 is redirected to domain name 152, system 130 can determine that client 104 has selected certificate-based authentication and initiate certificate-based authentication 162 for client 104.

Authentication Methods in Domain Names

Figure 2A:
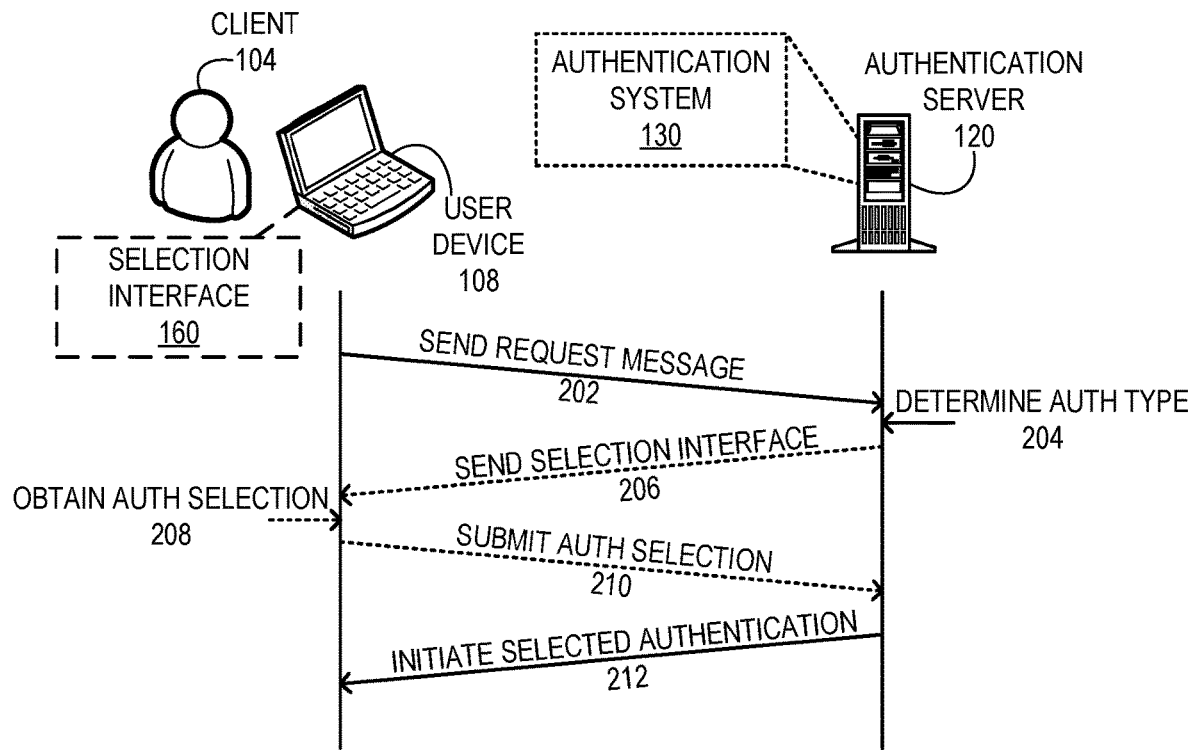
FIG. 2A illustrates an exemplary communication for selecting an authentication method for secure transport layer communication, in accordance with an embodiment of the present application.

FIG. 2A illustrates an exemplary communication for selecting an authentication method for secure transport layer communication, in accordance with an embodiment of the present application. During operation, client 104's device 108 can send a request message to system 130 (operation 202). The request can be based on a TLS message. Upon receiving the request, system 130 can determine the authentication type (operation 204). System 130 can inspect the SNI extension of the TLS message to inspect a domain name. If the domain name indicates that certificate-based authentication is enforced for client 104 (e.g., authN is enforced), system 130 can initiate the certificate-based authentication, as selected by client 104 (operation 212).

On the other hand, if the domain name indicates that certificate-based authentication is not enforced for client 104, system 130 can send a selection interface (e.g., interface 160 in FIG. 1A) to device 108 (operation 206). The selection interface, running on device 108, can obtain an authentication selection from client 104 (operation 208). Examples of the selection interface include, but are not limited to, a web interface, a window facilitated by an operating system of device 108, and an interface of a client-side application running on device 108. The web interface can be based on one or more of: HTTP, a client-side scripting language (e.g., JavaScript), and a server-side scripting language (e.g., Java Server Pages (JSP), Active Server Pages (ASP), and PHP).

The authentication selection can then be submitted to system 130 (operation 210). For example, the selection can be submitted to system 130 as a web form submission (e.g., by clicking a submit button). If the authentication selection indicates certificate-based authentication, the request can be redirected to the domain name associated with the certificate-based authentication, thereby initiating the certificate-based authentication using the same IP address/port (operation 212). However, if the authentication selection indicates some other form of authentication, system 130 can then initiate the selected method of authentication (operation 212).

Initiating the selected method of authentication can include sending a request for authentication information associated with the selected authentication method to device 108. The request for authentication information can include one or more of: a request for a certificate, a username/password combination, a PIN, a verification code (e.g., sent via a text message), link-based validation information (e.g., clicking on a link sent from system 130 to an email or any other form of communication) third-party validation information (e.g., authenticating using client 104's credentials of email, storage, or social media services), a digital signature, biometric information associated with client 104, smart card information (e.g., by reading the smart card using a reader), and information generated from an optical code sent by system 130. It should be noted that the request for authentication information may seek other information associated with client 104 and/or device 108 that is not listed above.

Figure 2B:
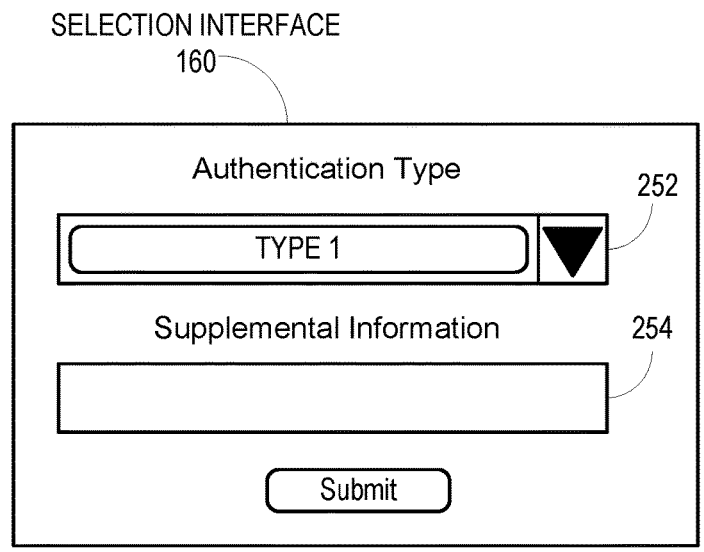
FIG. 2B illustrates an exemplary selection interface for selecting an authentication method for secure transport layer communication, in accordance with an embodiment of the present application.

FIG. 2B illustrates an exemplary selection interface for selecting an authentication method for secure transport layer communication, in accordance with an embodiment of the present application. Selection interface 160 can include a selection field 252 from which a client may select an authentication method. Field 252 can be a drop-down menu comprising a list of the generic authentication methods supported by an authentication system (e.g., system 130 in FIG. 1A). The list may include certificate-based authentication as well. Field 252 can also by any other form of input field that may allow the client to select an authentication method. For example, field 252 can also include a set of radio buttons. If the client is allowed to select multiple authentication methods, field 252 can also include a set of checkboxes.

Interface 160 can further include a supplemental information field 254 that may assist the client in providing additional information associated with the selected authentication method. If the client is allowed to select multiple authentication methods, information field 254 can be a set of corresponding text boxes that may allow the client to rank the choices provided in field 252. Information field 254 can also include one or more fields to provide authentication information based on the selected authentication method in field 252. For example, if the client has selected a password-based authentication, information field 254 may provide fields to enter the username and password of the client (e.g., selected based on client-side scripting embedded in interface 160). This may allow interface 160 to obtain information from a client without a round-trip communication with the corresponding authentication system. In addition, interface 160 can include a submit button that allows the client to submit the selection provided in interface 160 to the authentication system.

Operations

Figure 3A:
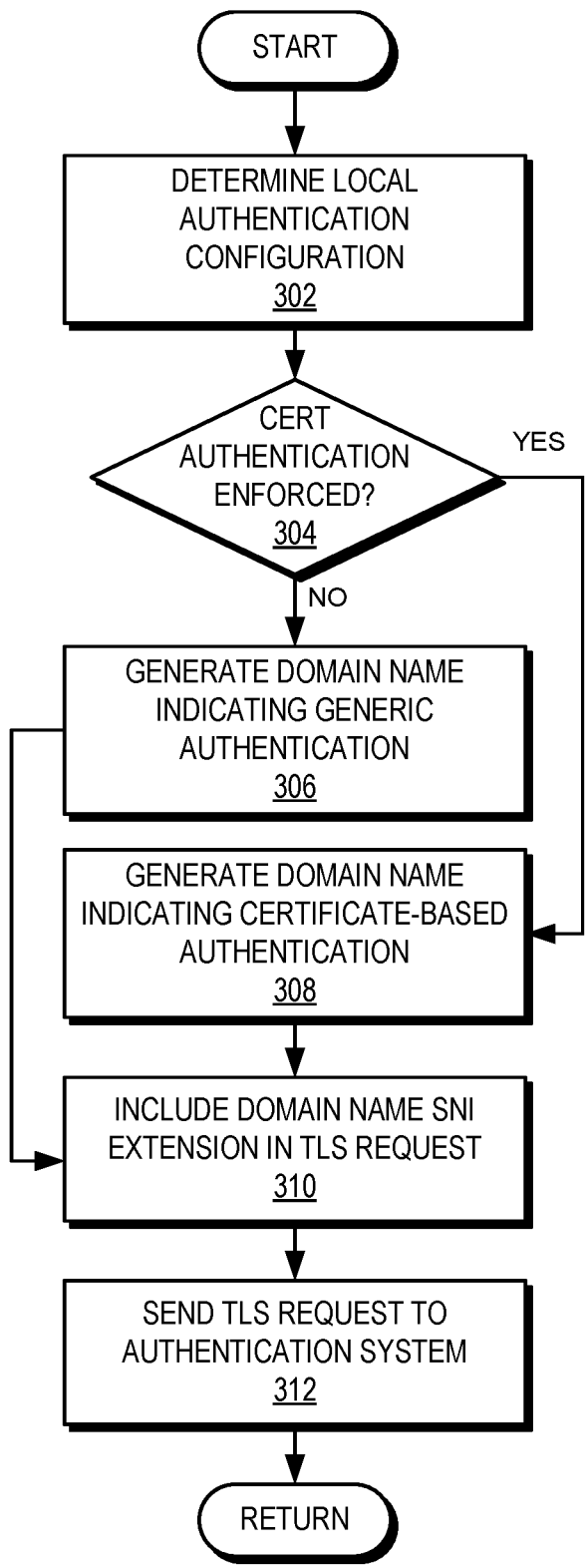
FIG. 3A presents a flowchart illustrating a method of a client device requesting authentication with an authentication method indicator, in accordance with an embodiment of the present application.

FIG. 3A presents a flowchart illustrating a method of a client device requesting authentication with an authentication method indicator, in accordance with an embodiment of the present application. During operation, the device can determine the local authentication configuration (operation 302) and determine whether certificate-based authentication is enforced (e.g., authN is enforced at the TLS level) (operation 304). If certificate-based authentication is not enforced, the device can generate a domain name indicating generic authentication (operation 306). Generic authentication can indicate any authentication method that can be selected from a selection interface. The device can prepend a domain name segment to a target domain name associated with a piece of resource to generate the domain name.

On the other hand, if certificate-based authentication is enforced, the device can generate a domain name indicating certificate-based authentication (operation 308). Certificate-based authentication can be based on a smart card, such as a CAC. The smart card can facilitate the certificate. Upon generating the domain name (operation 306 or 308), the device can include the domain name in the SNI extension of a TLS request (operation 310). The device can then send the TLS request to a corresponding authentication system (operation 312). In this way, the device can notify the authentication system whether certificate-based authentication is enforced prior to initiating an HTTP connection.

Figure 3B:
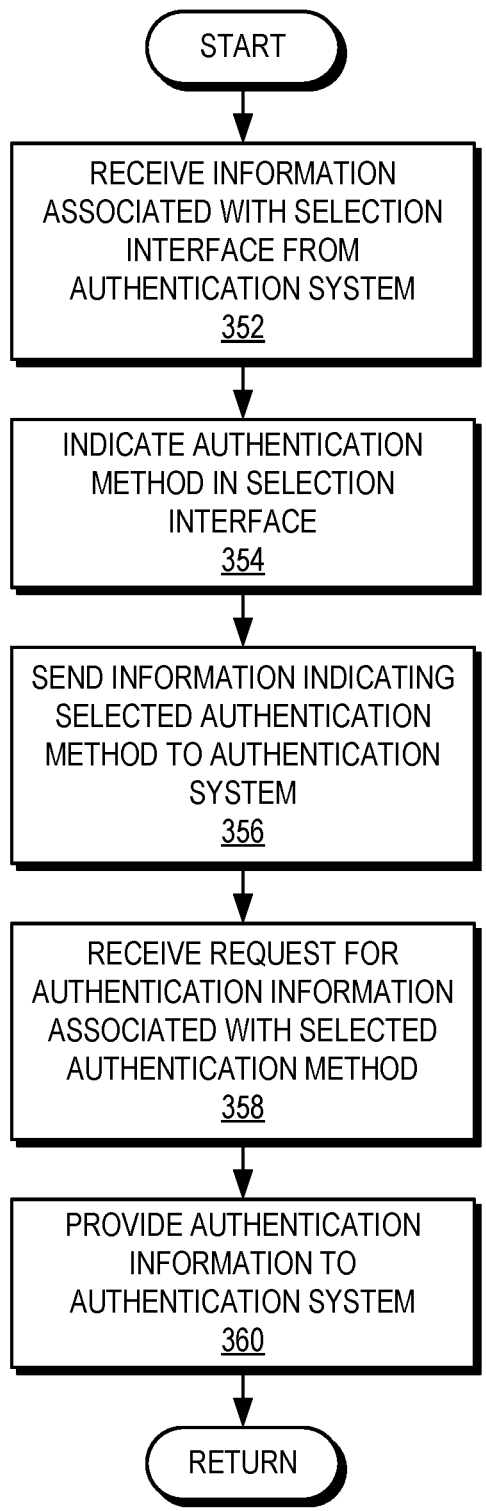
FIG. 3B presents a flowchart illustrating a method of a client device authenticating based on a selected authentication method, in accordance with an embodiment of the present application.

FIG. 3B presents a flowchart illustrating a method of a client device authenticating based on a selected authentication method, in accordance with an embodiment of the present application. During operation, the device receives information associated with a selection interface from an authentication system (operation 352). The information can include information representing a web form generated by the authentication system. The device can indicate an authentication method in the selection interface (operation 354). The device can obtain an input from the client on the selection interface for selecting the authentication method. For example, if the authentication methods are represented by a drop-down menu, the input can select an authentication method from the drop-down menu.

The device can then send the information indicating the selected authentication method to the authentication system (operation 356). The selection can be included in a packet generated based on a web form submission (e.g., by clicking on the submit button). The device can then receive a request for authentication information associated with the selected authentication method (operation 358). The device can provide the authentication information to the authentication system. The device can obtain the authentication information from the client, a smart card of the client, and/or one or more devices of the client.

Figure 4A:
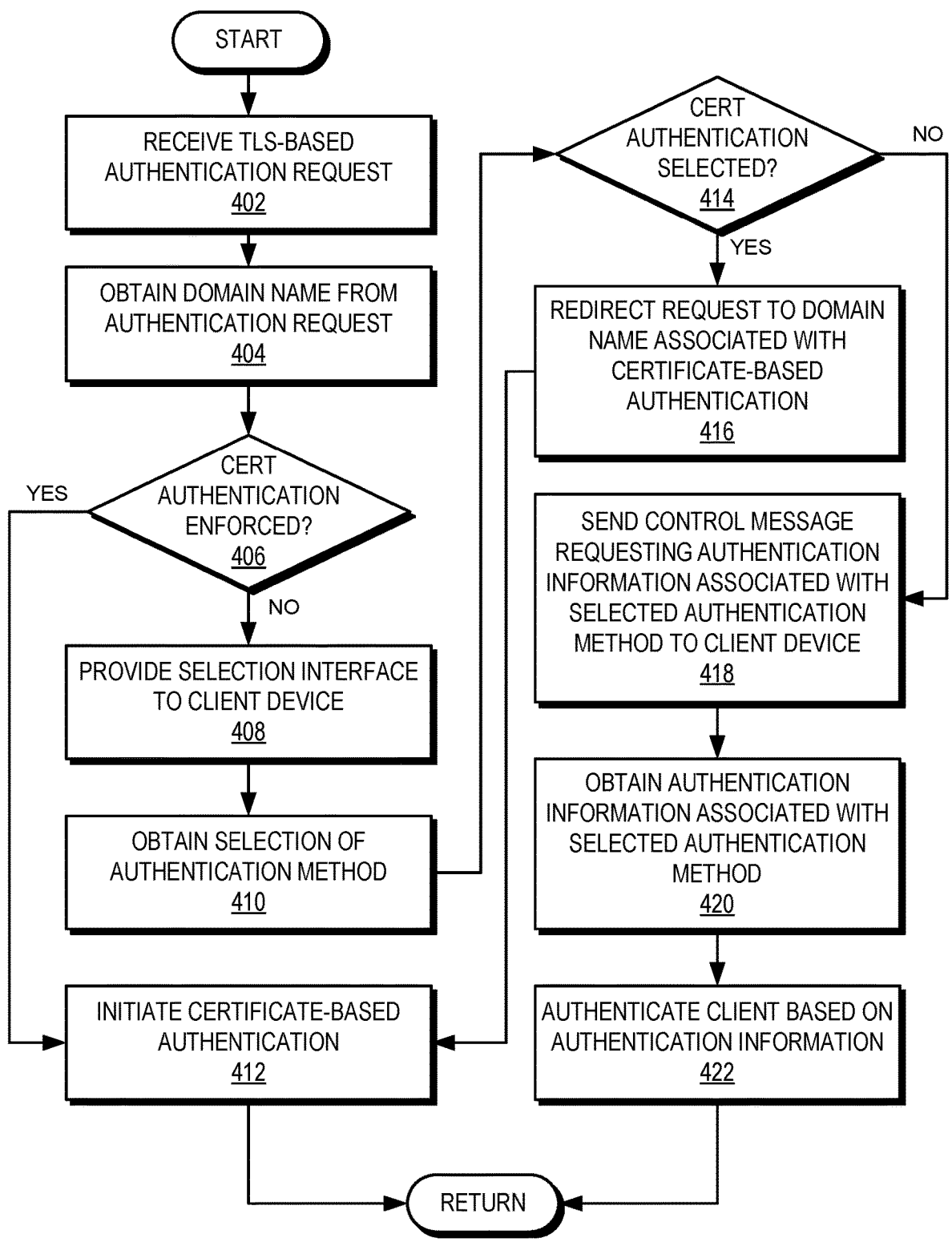
FIG. 4A presents a flowchart illustrating a method of authentication system authenticating a client based on an authentication method indicator in the authentication request, in accordance with an embodiment of the present application.

FIG. 4A presents a flowchart illustrating a method of authentication system authenticating a client based on an authentication method indicator in the authentication request, in accordance with an embodiment of the present application. During operation, the system can receive a TLS-based authentication request (operation 402) and obtain a domain name from the authentication request (operation 404). In some embodiments, the system can obtain the domain name from the SNI extension of TLS. The system can then determine whether certificate-based authentication is enforced for the client (operation 406).

If authentication with a certificate is not enforced for the client, the system can provide a selection interface to the client device (operation 408) and obtain a selection of an authentication method (operation 410). The system can then determine whether the user has selected certificate-based authentication (operation 414). If the user has not selected certificate-based authentication, the system can send a control message requesting authentication information associated with the selected authentication method to the client device (operation 418). The system can then obtain authentication information associated with the selected authentication method (operation 420) and authenticate the client based on the authentication information (operation 422).

On the other hand, if the user has selected certificate-based authentication, the system can redirect the request to the domain name associated with the certificate-based authentication (operation 416). Since the domain name associated with the certificate-based authentication is mapped to the same IP address/port allocated for the domain name associated with generic authentication, the redirection of the request can be directed to the IP address/port. If certificate-based authentication is enforced for the client (operation 406) or the request is redirected to the domain name associated with the certificate-based authentication (operation 416), the system can initiate the certificate-based authentication for the client (operation 412).

Figure 4B:
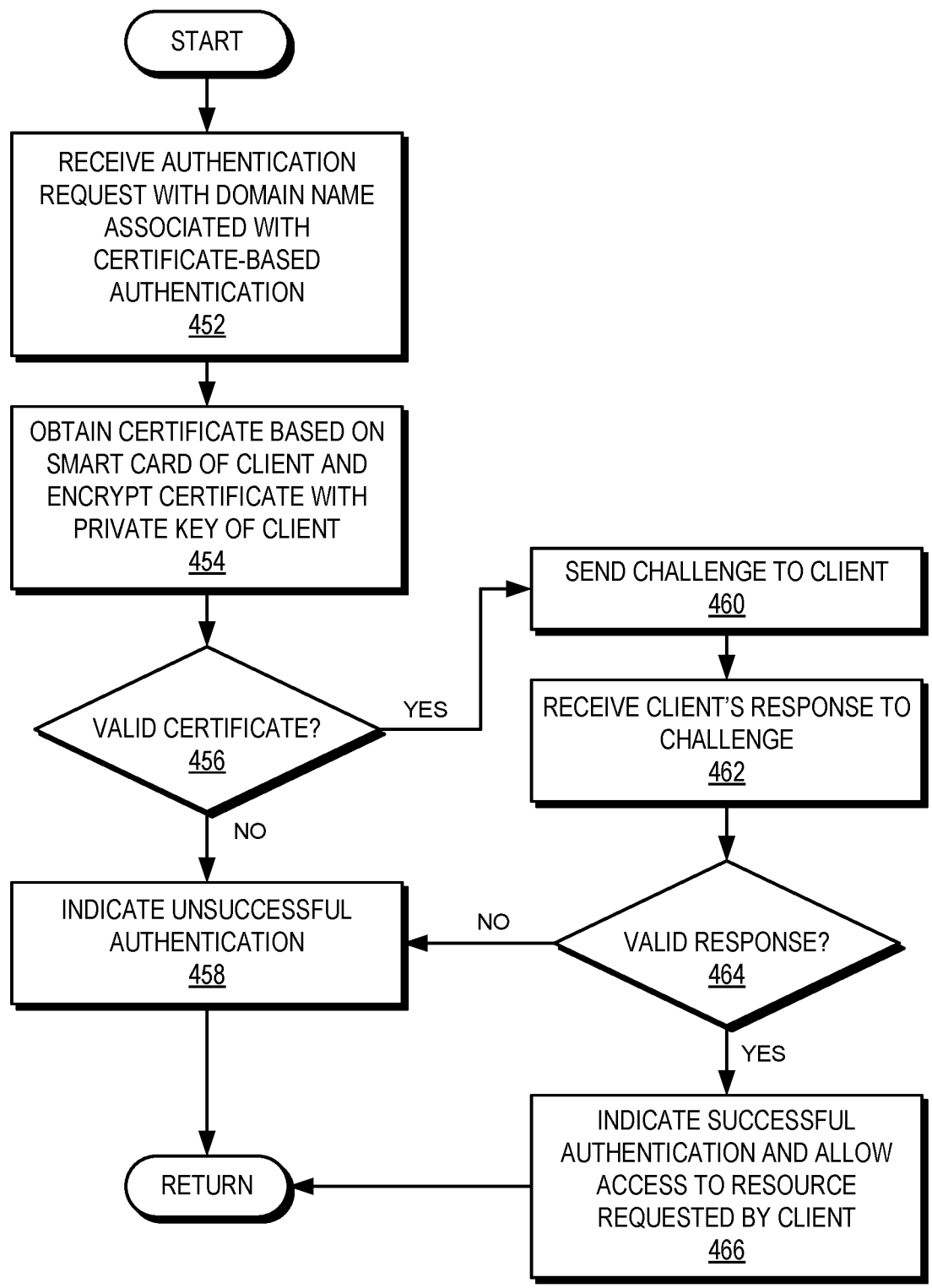
FIG. 4B presents a flowchart illustrating a method of authentication system authenticating a client based on a certificate-based authentication method, in accordance with an embodiment of the present application.

FIG. 4B presents a flowchart illustrating a method of authentication system authenticating a client device based on a certificate-based authentication method, in accordance with an embodiment of the present application. During operation, the system can receive an authentication request with a domain name associated with certificate-based authentication (operation 452). The system can then obtain a certificate based on a smart card (e.g., a CAC) of the client and encrypt certificate with a private key of the client (operation 454). The system can determine whether the certificate is valid (operation 456).

If the certificate is valid, the system can send a challenge to the client (operation 460). The challenge can be a piece of information that can be known by the client and validated by the system. For example, the challenge can be based on a PIN and/or a username/password. The system can then receive the client's response to the challenge (operation 462) and determine whether the response is valid (operation 464). If the response is valid, the system can indicate a successful authentication and allow access to the resource requested by the client (operation 466). On the other hand, if the certificate or the response is not valid (operation 456 or 464), the system can indicate an unsuccessful authentication (operation 458).

Exemplary Computer System and Apparatus

Figure 5:
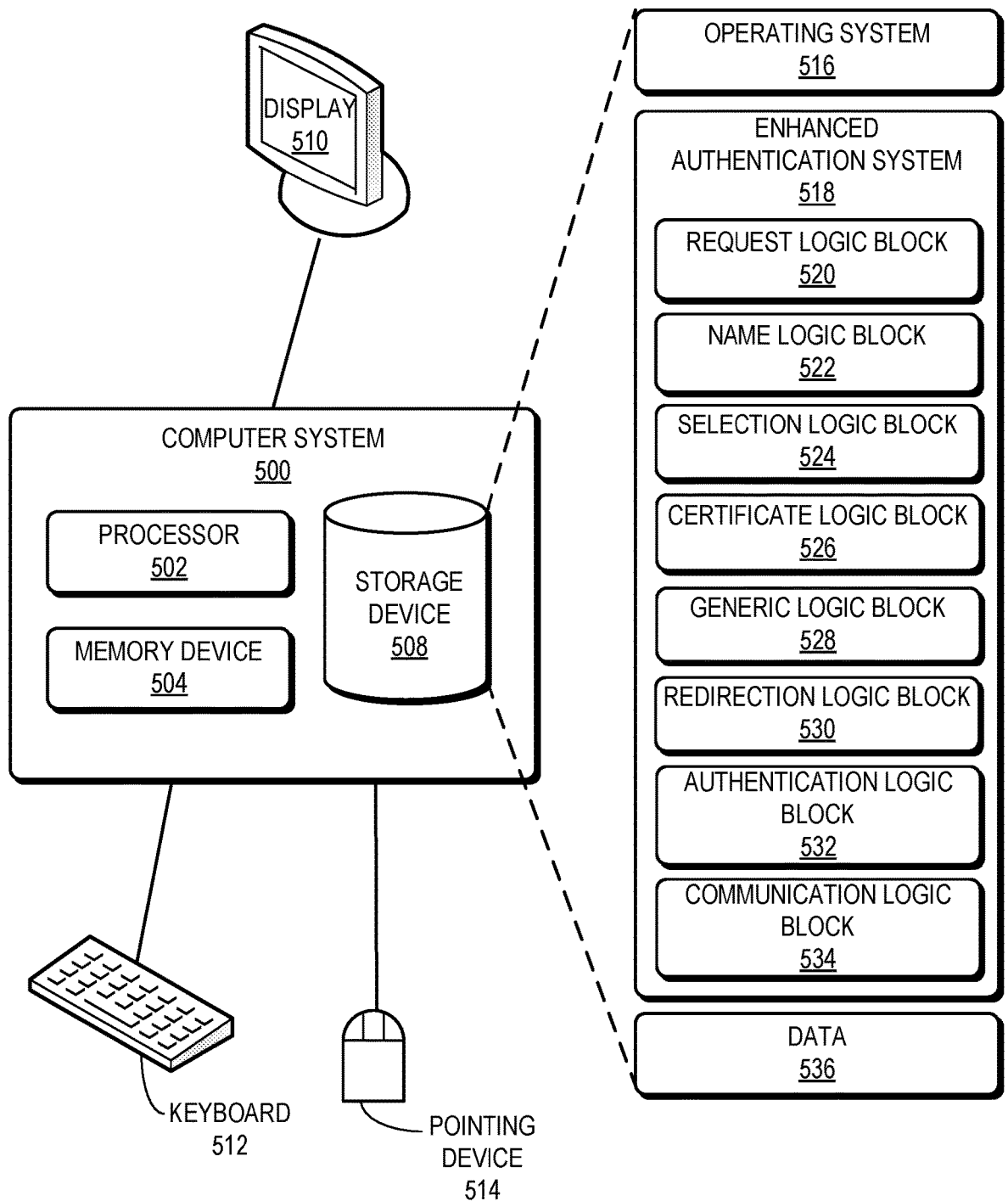
FIG. 5 illustrates an exemplary computer system that facilitates an efficient selection of authentication methods for secure transport layer communication, in accordance with an embodiment of the present application.

FIG. 5 illustrates an exemplary computer system that facilitates efficient selection of authentication methods for secure transport layer communication, in accordance with an embodiment of the present application. Computer system 500 includes a processor 502, a memory 504, and a storage device 508. Memory 504 can include volatile memory (e.g., a dual in-line memory module (DIMM)). Furthermore, computer system 500 can be coupled to a display device 510, a keyboard 512, and a pointing device 514. Storage device 508 can store an operating system 516, an enhanced authentication system 518, and data 536. Enhanced authentication system 518 can facilitate the operations of authentication system 130. It should be noted that, depending on the operations executed on a specific device, enhanced authentication system 518 may include a subset of the logic blocks on that device.

Enhanced authentication system 518 can include instructions, which when executed by computer system 500, can cause computer system 500 to perform methods and/or processes described in this disclosure. Specifically, enhanced authentication system 518 can include instructions for obtaining and responding to authentication requests (request logic block 520). Furthermore, enhanced authentication system 518 can include instructions for facilitating and distinguishing domain names associated with certificate-based-authentication and generic authentication (name logic block 522).

Furthermore, enhanced authentication system 518 can include instructions for presenting a selection interface to a client (selection logic block 524). Enhanced authentication system 518 can also include instructions for obtaining a selection from the interface (selection logic block 524). Enhanced authentication system 518 can further include instructions for facilitating certificate-based authentication to the client based on a domain name or a selection from the client (certificate logic block 526). In addition, enhanced authentication system 518 can also include instructions for facilitating generic authentication to the client based on a domain name or a selection from the client (generic logic block 528).

Furthermore, enhanced authentication system 518 can include instructions for redirecting a request to a domain name associated with the certificate-based authentication (redirection logic block 530). Moreover, enhanced authentication system 518 includes instructions for authenticating a client based on the authentication method indicated in the domain name or the user interface (authentication logic block 532). Enhanced authentication system 518 can also include instructions for sending and receiving messages (e.g., based on TLS and/or HTTP) (communication module 534).

Data 536 can include any data that is required as input or that is generated as output by the methods and/or processes described in this disclosure. Specifically, data 536 can store information associated with a selection interface, authentication methods supported by enhanced authentication system 518, and authentication information for authenticating a respective client.

Figure 6:
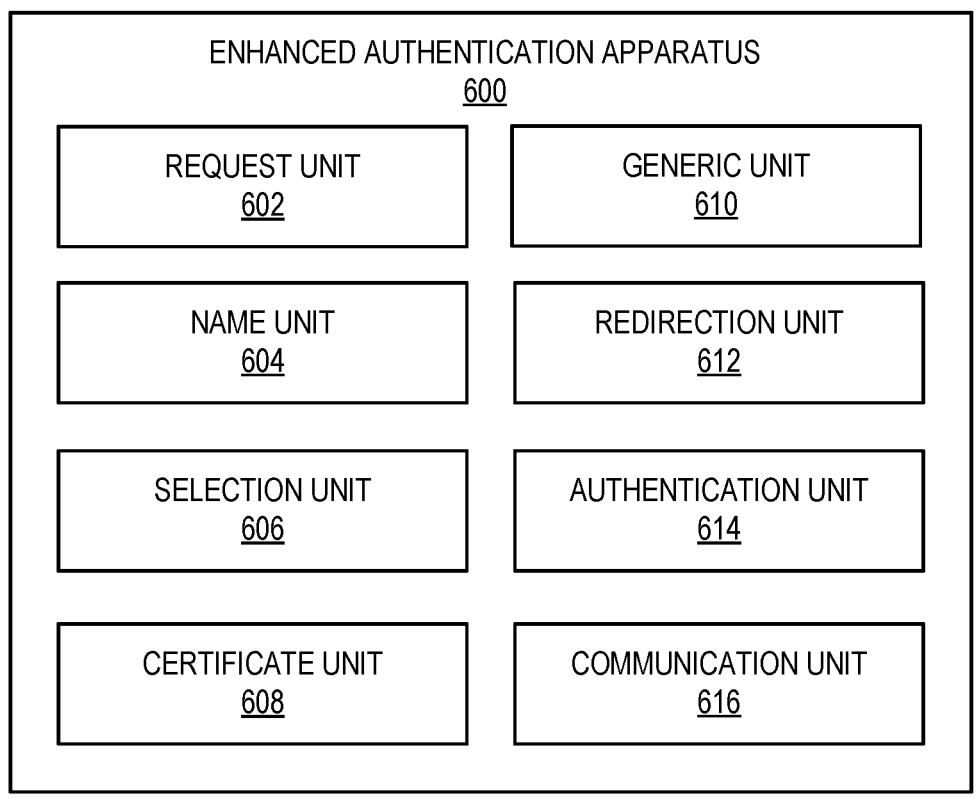
FIG. 6 illustrates an exemplary apparatus that facilitates supports an efficient selection of authentication methods for secure transport layer communication, in accordance with an embodiment of the present application.

FIG. 6 illustrates an exemplary apparatus that facilitates efficient selection of authentication methods for secure transport layer communication, in accordance with an embodiment of the present application. Enhanced authentication apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Apparatus 600 may also be a network device (e.g., a switch, a router, etc.).

Specifically, apparatus 600 can comprise units 602-616, which perform functions or operations similar to modules 520-534 of computer system 500 of FIG. 5, including: a request unit 602; a name unit 604; a selection unit 606; a certificate unit 608; a generic unit 610; a redirection unit 612; an authentication unit 614; and a communication unit 616.

Note that the above-mentioned modules can be implemented in hardware as well as in software. In one embodiment, these modules can be embodied in computer-executable instructions stored in a memory which is coupled to one or more processors in computer system 500 and/or apparatus 600. When executed, these instructions cause the processor(s) to perform the aforementioned functions.

In summary, embodiments of the present invention provide a system and a method that facilitates an enhanced authentication system. During operation, the system can obtain, from a remote device of a client, an authentication request prior to the exchange of application layer web traffic associated with a piece of resource protected by the system. The system can then determine, in the authentication request, an indicator indicating whether certificate-based authentication is enforced for the client. If certificate-based authentication is enforced for the client, the system can initiate certificate-based authentication for the client. On the other hand, if certificate-based authentication is not enforced for the client, the system can send information associated with a user interface to the client. The user interface can allow the client to select an authentication method from a set of authentication methods supported by the system.

The methods and processes described herein can be embodied as code and/or data, which can be stored in a non-transitory computer-readable storage medium. When a computer system reads and executes the code and/or data stored on the non-transitory computer-readable storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating an enhanced authentication system, comprising:
   obtaining, by the authentication system, an authentication request from a remote device of a client prior to exchange of application layer web traffic for assessing a piece of resource protected by the authentication system;
   identifying, in the authentication request, a domain name indicating enforcement of certificate-based authentication for the client;
   determining whether certificate-based authentication is enforced for the client based on the domain name;
   in response to determining that certificate-based authentication is enforced for the client, initiating, by the authentication system, certificate-based authentication for the remote device of the client for assessing the piece of resource; and
   in response to determining that certificate-based authentication is not enforced for the client;
   sending, by the authentication system, information associated with a user interface to the remote device of the client, wherein the information indicates a set of authentication methods supported by the authentication system, and wherein the user interface facilitates selection of an authentication method from the set of authentication methods for assessing the piece of resource; and
   in response to determining a selection of certificate-based authentication in the user interface based on information from the remote device, redirecting the request for initiating certificate-based authentication for the remote device of the client.

2. The method of claim 1, wherein the authentication request is based on a Transport Layer Security (TLS) protocol, and wherein the domain name is included in server name indication (SNI) extension of the TLS protocol.

3. The method of claim 1, wherein the domain name is one of:
   a first domain name associated with the certificate-based authentication; and
   a second domain name associated with generic authentication indicated in the user interface.

4. The method of claim 3, wherein the first and second domain names associated with the domain name correspond to a same point of access for the remote device of the client, wherein the point of access is indicated by one or more of: an Internet Protocol (IP) address and a port identifier, and wherein the first and second domain names are accessible via a same pinhole of a firewall of the authentication system.

5. The method of claim 1, wherein the application layer web traffic is based on Hypertext Transfer Protocol (HTTP) or a variation thereof.

6. The method of claim 1, further comprising:
   determining an authentication method selected at the user interface based on information from the remote device; and
   sending, to the remote device, a request for authentication information that authenticates the client using the selected authentication method.

7. The method of claim 1, wherein initiating the certificate-based authentication for the client further comprises:
   obtaining a certificate configured in a smart card of the client; and
   validating the certificate and an identity of the client, wherein validating the identity includes authenticating the client based on a piece of information provided by the client.

8. The method of claim 7, wherein the smart card is a common access card (CAC), and wherein the certificate-based authentication includes CAC-based authentication.

9. A non-transitory computer-readable storage medium storing instructions that when executed by a computer cause the computer to perform a method for facilitating an enhanced authentication system, the method comprising:
   obtaining, by the authentication system, an authentication request from a remote device of a client prior to exchange of application layer web traffic for accessing a piece of resource protected by the authentication system;
   identifying, in the authentication request, a domain name indicating enforcement of certificate-based authentication for the client;
   determining whether certificate-based authentication is enforced for the client based on the domain name;
   in response to determining that certificate-based authentication is enforced for the client, initiating, by the authentication system, certificate-based authentication for the remote device of the client for assessing the piece of resource; and
   in response to determining that certificate-based authentication is not enforced for the client;
   sending, by the authentication system, information associated with a user interface to the remote device of the client, wherein the information indicates a set of authentication methods supported by the authentication system, and wherein the user interface facilitates selection of an authentication method from the set of authentication methods for assessing the piece of resource; and
   in response to determining a selection of certificate-based authentication in the user interface based on information from the remote device, redirecting the request for initiating certificate-based authentication for the remote device of the client.

10. The non-transitory computer-readable storage medium of claim 9, wherein the authentication request is based on a Transport Layer Security (TLS) protocol, and wherein the domain name is included in server name indication (SNI) extension of the TLS protocol.

11. The non-transitory computer-readable storage medium of claim 9, wherein the domain name is one of:
   a first domain name associated with the certificate-based authentication; and
   a second domain name associated with generic authentication indicated in the user interface.

12. The non-transitory computer-readable storage medium of claim 11, wherein the first and second domain names associated with domain name correspond to a same point of access for the remote device of the client, wherein the point of access is indicated by one or more of: an Internet Protocol (IP) address and a port identifier, and wherein the first and second domain names are accessible via a same pinhole of a firewall of the authentication system.

13. The non-transitory computer-readable storage medium of claim 9, wherein the application layer web traffic is based on Hypertext Transfer Protocol (HTTP) or a variation thereof.

14. The non-transitory computer-readable storage medium of claim 9, wherein the method further comprises:
   determining an authentication method selected at the user interface based on information from the remote device; and
   sending, to the remote device, a request for authentication information that authenticates the client using the selected authentication method.

15. The non-transitory computer-readable storage medium of claim 9, wherein initiating the certificate-based authentication for the client further comprises:
   obtaining a certificate configured in a smart card of the client; and
   validating the certificate and an identity of the client, wherein validating the identity includes authenticating the client based on a piece of information provided by the client.

16. The non-transitory computer-readable storage medium of claim 15, wherein the smart card is a common access card (CAC), and wherein the certificate-based authentication includes CAC-based authentication.

17. A computer system, comprising:
   a processor;
   a storage device; and
   a memory coupled to the processor and storing instructions, which when executed by the processor cause the processor to perform a method for facilitating an enhanced authentication system, the method comprising:
   obtaining, by the authentication system, an authentication request from a remote device of a client prior to exchange of application layer web traffic for accessing a piece of resource protected by the authentication system;
   identifying, in the authentication request, a domain name indicating enforcement of certificate-based authentication for the client;
   determining whether certificate-based authentication is enforced for the client based on the domain name;
   in response to determining that certificate-based authentication is enforced for the client, initiating, by the authentication system, certificate-based authentication for the remote device of the client for assessing the piece of resource; and
   in response to determining that certificate-based authentication is not enforced for the client;
   sending, by the authentication system, information associated with a user interface to the remote device of the client, wherein the information indicates a set of authentication methods supported by the authentication system, and wherein the user interface facilitates selection of an authentication method from the set of authentication methods for assessing the piece of resource; and
   in response to determining a selection of certificate-based authentication in the user interface based on information from the remote device, redirecting the request for initiating certificate-based authentication for the remote device of the client.

18. The computer system of claim 17, wherein the authentication request is based on a Transport Layer Security (TLS) protocol, wherein the domain name is included in server name indication (SNI) extension of the TLS protocol, and wherein the domain name is one of:
   a first domain name associated with the certificate-based authentication; and
   a second domain name associated with generic authentication indicated in the user interface.

19. The computer system of claim 17, wherein the domain name is one of:
   a first domain name associated with the certificate-based authentication; and
   a second domain name associated with generic authentication indicated in the user interface.

20. The computer system of claim 19, wherein the first and second domain names associated with the domain name correspond to a same point of access for the remote device of the client, wherein the point of access is indicated by one or more of: an Internet Protocol (IP) address and a port identifier, and wherein the first and second domain names are accessible via a same pinhole of a firewall of the authentication system.

* * * * *